No. 772,787. PATENTED OCT. 18, 1904.
W. J. CONNELL.
RECEPTACLE.
APPLICATION FILED JUNE 18, 1904.
NO MODEL.

Witnesses
Geo. Ackman Jr.
Hubert D. Lawson

Inventor
William J. Connell,
By Victor J. Evans
Attorney

No. 772,787.

Patented October 18, 1904.

UNITED STATES PATENT OFFICE.

WILLIAM J. CONNELL, OF FAIRMONT, WEST VIRGINIA.

RECEPTACLE.

SPECIFICATION forming part of Letters Patent No. 772,787, dated October 18, 1904.

Application filed June 18, 1904. Serial No. 213,187. (No model.)

*To all whom it may concern:*

Be it known that I, WILLIAM J. CONNELL, a citizen of the United States, residing at Fairmont, in the county of Marion and State of West Virginia, have invented new and useful Improvements in Receptacles, of which the following is a specification.

My invention relates to new and useful improvements in receptacles for liquids; and its object is to provide a device of this character having an inlet which is adapted to be sealed subsequent to the filling of the receptacle and an outlet-spout in one side of the receptacle having a valve normally closing it, but which can be released to permit the discharge of the contents without removing the closure from the inlet.

With the above and other objects in view the invention consists of a receptacle formed of any suitable material and having an inlet which is adapted to be closed by a cork or other suitable device. A spout is formed at one side of the receptacle and has two communicating passages therein, one of said passages opening into the receptacle and the other opening through the outer end of the spout. A valve is seated within the first-mentioned passage for closing the outlet from the receptacle, and the movement of this valve is controlled by a plunger, which is connected to a spring-handle adapted to engage and lock upon the spout.

The invention also consists of the further novel construction and combination of parts hereinafter more fully described and claimed, and illustrated in the accompanying drawings, showing the preferred form of my invention, and in which—

Figure 1:
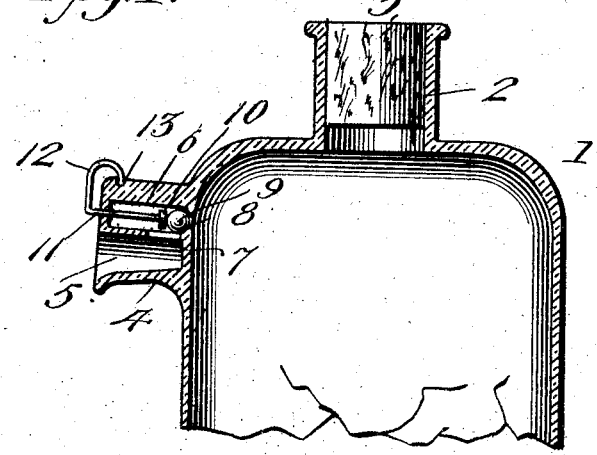
Figure 2:
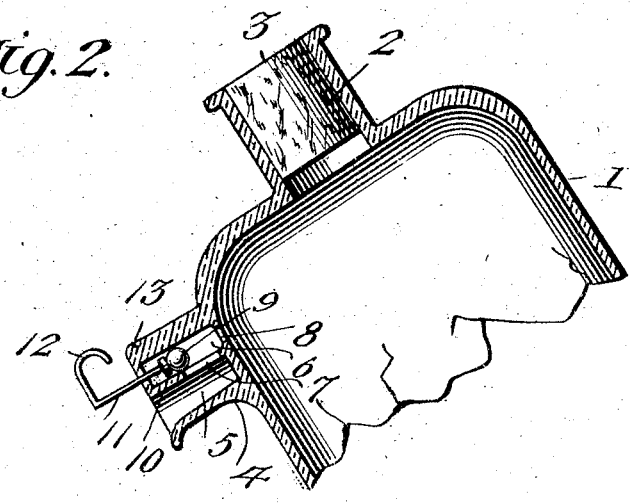

Figure 1 is a vertical section through the upper portion of a receptacle constructed in accordance with my invention and showing the valve in closing position, and Fig. 2 is a similar view showing the receptacle tilted and the valve removed from the outlet.

Referring to the figures by numerals of reference, 1 is a receptacle having a neck 2 extending therefrom, which is adapted to be sealed by a cork 3 or other suitable closure. Arranged upon one side of the receptacle is a spout 4, having two passages 5 and 6 therein arranged one above the other. These two passages communicate at the inner end of the spout through an aperture 7, and the inner end of passage 6 opens through an outlet 8 into the receptacle 1. The outer end of this passage, however, is closed, while the inner end of passage 5 is closed, but its outer end open. A ball-valve 9 is loosely mounted in passage 6 and is adapted to close the outlet 8. This ball is contacted by a head 10, formed at one end of a rod 11, which is slidably mounted in the outer end of passage 6 and has a hook 12 formed integral therewith and extending at right angles therefrom. This hook, as well as rod 11, is formed of spring metal and is adapted to engage a recess or notch 13, formed in the outer surface of spout 4. When hook 12 engages this notch, the head 10 of rod 11 presses against valve 9 and holds it seated over outlet 8. The ball 9 is normally held in this position to prevent the escape of liquid therethrough. When it is desired to fill the receptacle, the the seal 3 is removed and the liquid is poured through neck 2, after which the seal is placed in position. When it is desired to remove the contents, the spring-hook 12 is removed from engagement with notch 13 and pulled outward, thereby permitting the ball 9 to roll from outlet 8. Therefore when the receptacle is inclined liquid will pass outward through outlet 8, aperture 7, and passage 5. It will be seen that the extension 12 exerts a pressure at all times upon rod 11 and ball 9, while the end thereof engages notch 13, and therefore accidental unseating of the ball is prevented. The entire receptacle and spout can be formed in one piece of glass or of any other suitable material.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. A liquid-receptacle comprising a spout having communicating passages extending side by side, each passage being closed at one end and open at the other, the open ends being reversely disposed so that one passage communicates with the receptacle-outlet and the other forms the discharge-orifice, a valve controlling the outlet, and a valve-retaining device operated from the outside of the receptacle.

2. A liquid-receptacle comprising a spout having communicating passages extending side by side, each passage being closed at one end and open at the other, the open ends being reversely disposed so that one passage communicates with the receptacle-outlet and the other forms the discharge-orifice, a valve controlling the outlet, and a valve-seating rod having a spring-catch engagement with the spout upon the outside.

3. A liquid-receptacle comprising a spout having communicating passages extending side by side, each passage being closed at one end and open at the other, the open ends being reversely disposed so that one passage communicates with the receptacle-outlet and the other forms the discharge-orifice, a valve controlling the outlet, and a valve-seating rod having a spring extension which engages the exterior of the spout.

4. A liquid-receptacle comprising a spout having communicating passages extending side by side, each passage being closed at one end and open at the other, the open ends being reversely disposed so that one passage communicates with the receptacle-outlet and the other forms the discharge-orifice, a valve controlling the outlet, and a valve-seating rod provided with a spring extension adapted to snap into engagement with a shoulder on the outside of the spout for holding the valve closed.

In testimony whereof I affix my signature in presence of two witnesses.

WILLIAM J. CONNELL.

Witnesses:
 E. F. MORGAN,
 H. C. McKAY.